No. 898,312. PATENTED SEPT. 8, 1908.
C. W. BOYSE.
GAS LAMP.
APPLICATION FILED JAN. 6, 1908.
2 SHEETS—SHEET 1.
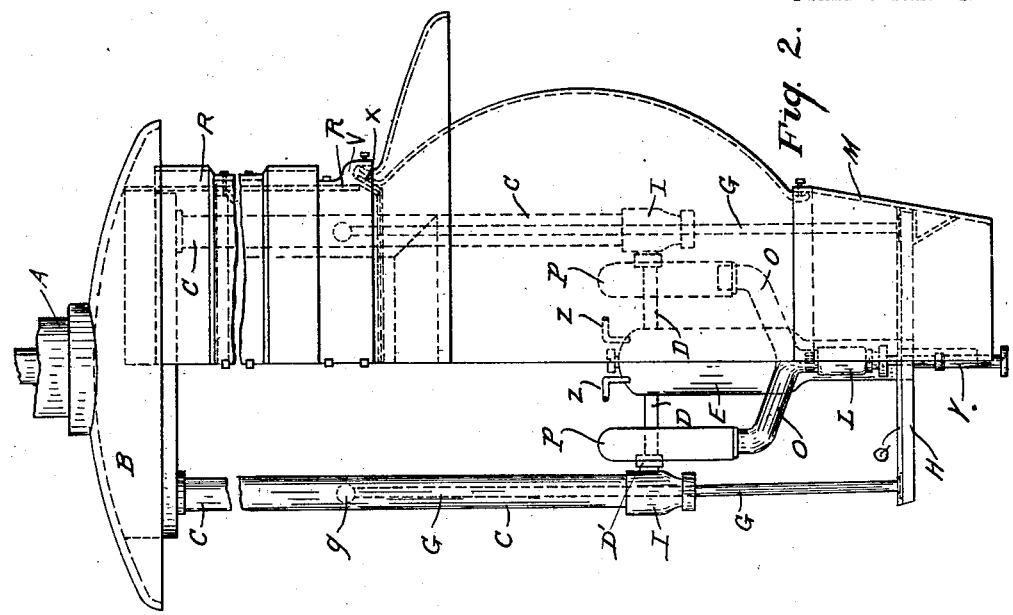
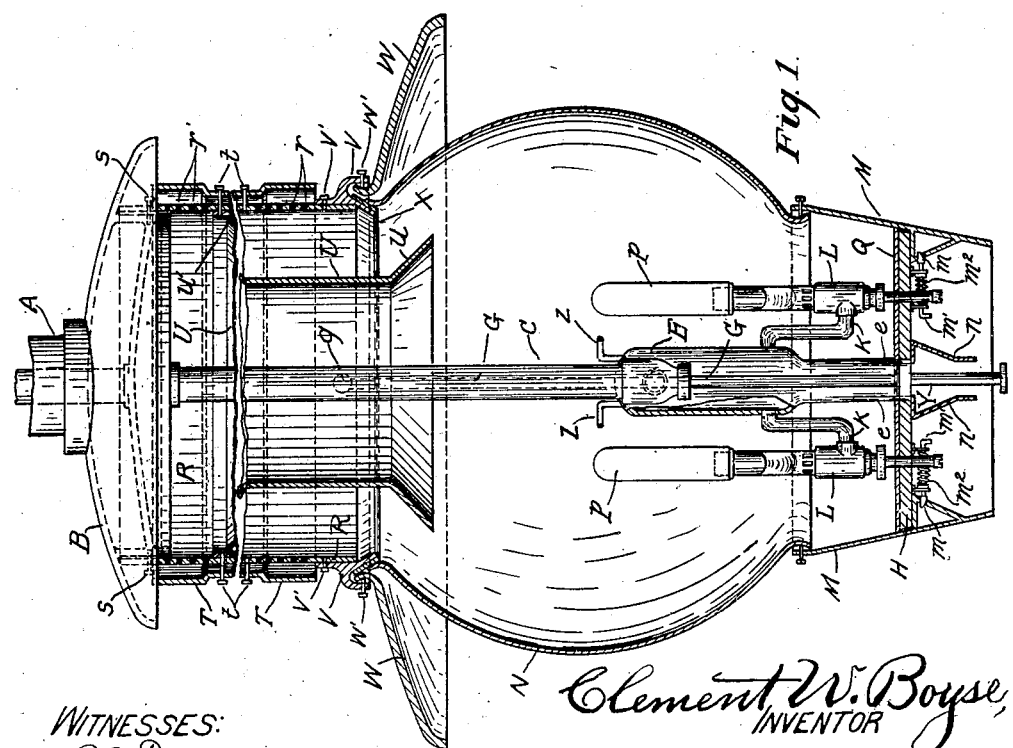
WITNESSES:
Clement W. Boyse,
INVENTOR
BY Charles Turner Brown,
ATTORNEY No. 898,312. PATENTED SEPT. 8, 1908.
C. W. BOYSE.
GAS LAMP.
APPLICATION FILED JAN. 6, 1908.
2 SHEETS—SHEET 2.
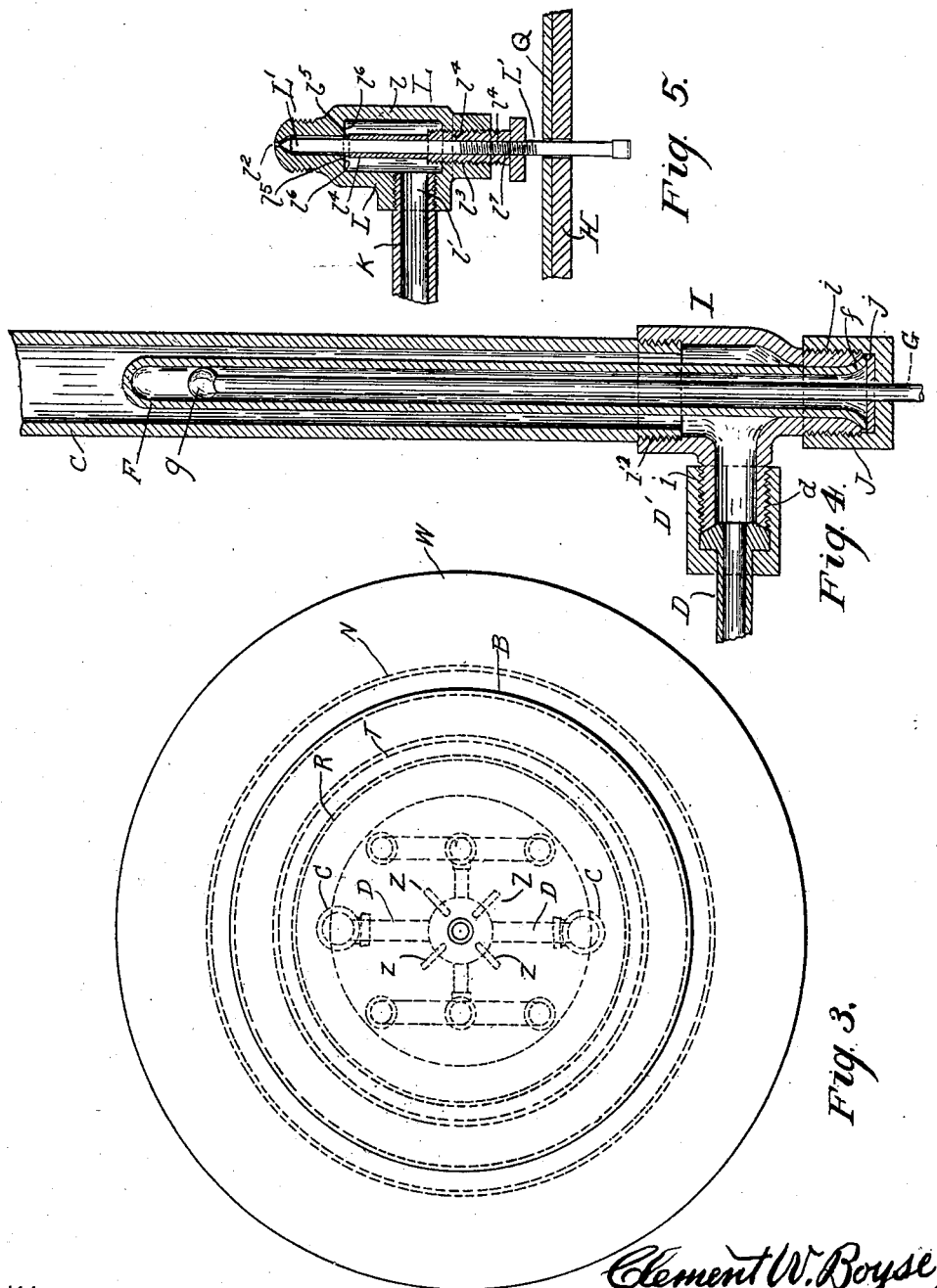

UNITED STATES PATENT OFFICE.

CLEMENT W. BOYSE, OF CHICAGO, ILLINOIS, ASSIGNOR OF ONE-HALF TO DWIGHT B. CARMICHAEL, OF CHICAGO, ILLINOIS.

GAS-LAMP.

No. 898,312.      Specification of Letters Patent.      Patented Sept. 8, 1908.

Application filed January 6, 1908. Serial No. 409,499.

*To all whom it may concern:*

Be it known that I, CLEMENT W. BOYSE, a citizen of the United States, and a resident of Chicago, in the county of Cook and State of Illinois, have invented certain new and useful Improvements in Gas-Lamps, of which the following, when taken in connection with the drawings accompanying and forming a part hereof, is a full and complete specification sufficient to enable those skilled in the art to which is pertains to understand, make, and use the same.

This invention relates to gas lamps provided with a plurality of Bunsen burners and incandescent mantles, which are designed to be used in places where they are subjected to climatic temperature, to wind, rain, snow and the like. And the object of this invention is to obtain a gas lamp of the kind described wherein no considerable smoking of the mantles will occur; wherein the required adjustment may be easily made; and a gas lamp which will be durable and not liable to get out of order or become injured.

The manner in which I obtain the several objects sought by me is illustrated in the drawings accompanying and forming a part hereof in which Figure 1 is a vertical sectional view of a lamp embodying this invention, with the burners, mantles and gas supply pipe shown in elevation. Fig. 2 is a vertical sectional view of one side of the lamp and an elevation of the gas supply pipe, gas cock, burners and mantles, on the other side of the lamp, such lamp being viewed at an angle of 90 degrees from the view in Fig. 1. Fig. 3 is a plan view of the lamp. Fig. 4 is a vertical sectional view of the greater portion of one of the gas supply pipes of the lamp. Fig. 5 is a vertical sectional view of the Bunsen burner of the lamp.

A reference letter applied to designate a given part is used to indicate such part throughout the several figures of drawings wherever the same appears.

A is a gas supply pipe which forms also the support from which the lamp depends.

B is the gas dome of the lamp, and such dome is attached to the gas supply pipe A by screw threads in the ordinary way of making pipe connections.

C, C, are gas supply pipes communicating at their upper ends respectively with a gas chamber in dome B and at their lower ends, by branch pipes D, D, with the casing E provided with a gas cock.

F, Fig. 4, is a tube in gas supply pipe C. Tube F is closed at its upper end.

G is a rod in tube F having the enlarged upper end $g$ and attached at the lower end to bottom H of the burner.

The branch pipes D, D, tube F and rod G are all secured together in suitable relative position, and so that no gas will escape from the supply pipe C, by means of the three way coupling I, union D' and the cap J.

The three way coupling I is provided with street-ell screw threads at $i$, $i$, on one end and on the side thereof, respectively, and at the other end with internal screw threads $i'$, fitting over corresponding threads on the lower end of the supply pipe C. The lower end of the closed tube F is swaged out substantially as at $f$, Fig. 4.

$j$ is a washer in cap J. Part $d$ of union D' and cap J are respectively provided with internal screw threads corresponding with the street-ell screw threads, $i$, on coupling I. The cap J is secured in place by means of the screw threads therein thereby securing the tube F in place.

K, K, are branch pipes, respectively, communicating at one end with the casing E and at the other end with the valve casing L, L. Casing L is illustrated in Fig. 5 of the drawings, and consists of the outer shell $l$ provided with the inlet $l'$, the needle valve outlet $l^2$ and the screw threaded opening $l^3$, the plug $l^4$ adjustably fitted into outer shell $l$ by means of corresponding screws thread and needle valve L'. The plug $l^4$ is adjusted by turning it until the passage way $l^5$, between the upper end of such plug and the shoulder $l^6$ of casing $l$, is of the desired area. Needle valve L' extends through the plug $l^4$ to the needle valve outlet $l^2$ and is provided with screw threads fitting into corresponding screw threads $l^7$ in such plug $l^4$. The plug $l^4$ and needle valve L' are adjusted to obtain a suitable supply of gas through the casing L, with suitable pressure thereof at needle valve outlet $l^2$, and the needle valve L⁴ is adjusted to deliver the suitable volume of gas therethrough.

M is the globe holder of the lamp and N is the globe. Globe holder M is secured in position to bottom H by means of latches $m, m$, and such globe holder can be lowered at any time by drawing the handle $m'$ of the latches $m$ back against the resiliency of the spring $m''$. The bottom H is held in place by springs $n, n$, which are secured at their upper ends, respectively, to part $e$ of the stop cock E.

O, O, are tubes extending upward and outward from the upper end of the valve casing L, and P, P, are mantles. When the lamp is operating gas flows downward through supply pipes C, C, through branch pipes D, D, gas cock E, pipes K, $k$, casings L, L, and pipes O, O, and is consumed underneath the mantles P, P, of the Bunsen burners in the ordinary way.

Q is a sheet of asbestos which preferably lies on bottom H; but such sheet of asbestos is not essential.

R is a wind shield provided with apertures $r, r$, at the lower end thereof and apertures $r', r'$, at the upper end thereof, for the flow of air therethrough. Wind shield R is secured to the dome B as by the set screws S, S.

T is an additional wind shield of larger diameter than is wind shield R and is secured in place, as by bolts or pins $t$, to protect the apertures $r, r$, respectively, from winds and also to obtain an annular space around the shield R through which air may flow upward and out of the upper end thereof.

U is a chimney flared at the lower end thereof, as at $u$, and at the upper end thereof, as at $u'$. The chimney U may be secured in place by the pins or bolts $t, t$, (see Fig. 1).

V is a shade holder.

W is a shade. Shade holder V is secured to the lower end of the wind shield R, as by pins or rivets V' and shade W is secured in position on shade holder V in the ordinary way, as by screws W'.

X is a ring, preferably of asbestos, between the top of the globe N and the shade holder V.

Y is a key by means of which the gas cock is operated. Key Y is removable.

When the springs $n, n$, are pressed inward and the bottom H is lowered the rods G, G, move downward therewith and until the enlarged ends $g, g$, thereon are in contact with washer $j$ in caps J, at which time the bottom H, globe holder M and globe N are supported on such rods.

Z, Z, are pilot lights.

The globe holder M and globe N may be removed from the lamp by withdrawing latches $n, n$, as heretofore described.

Having thus described my invention what I claim as new and desire to secure by Letters Patent is;—

1. The combination in a gas lamp of a gas cock casing, valve casings, gas pipes respectively communicating with the gas cock casing and with the several valve casings, pipes mounted on the discharge sides of the several valve casings, such pipes respectively provided with air inlets and provided with branch pipes, mantles on the discharge ends of the several branch pipes, means comprising a gas supply pipe thereto, to support the gas cock casing, a receptacle in which the gas cock casing, the valve casings and the communicating pipes, the branched pipes and the mantles are contained, such receptacle comprising a base, a globe on the base, a perforated pipe forming a wind shield, and a chimney, and means to removably attach the base of the receptacle to the gas cock casing; substantially as described.

2. The combination in a gas lamp, of a gas cock casing, valve casings, a plurality of discharge adjustments to such valve casings, gas pipes respectively communicating with the gas cock casing and with the several valve casings, pipes mounted on the discharge sides of the several valve casings, such pipes respectively provided with air inlets and provided with branch pipes, mantles on the discharge ends of the several branch pipes, means comprising gas supply pipes thereto, to support the gas cock casing, a receptacle in which the gas cock casing, the valve casings and the communicating pipes, the branched pipes and the mantles are contained, such receptacle comprising a base, a globe on the base, a perforated pipe forming a wind shield and a chimney, and means to removably attach the base of the receptacle to the gas cock casing; substantially as described.

3. The combination in a gas lamp of a casing provided with a gas chamber, a gas cock casing, gas supply pipes communicating with the gas chamber and the gas cock casing, such supply pipes arranged to form the support of the gas cock casing, valve casings, and gas pipes communicating with the gas cock casing and with the respective valve casing on the supply side of such valve casings, a pipe provided with branch pipes on and communicating with the respective valve casings on the discharge sides thereof, mantles on the discharge ends of the respective branch pipes, a pipe provided with perforations adjacent to the ends thereof, means to attach the pipe to the first named casing, an additional and larger pipe open at the ends and attached to the perforated pipe concentric to the axis thereof, such additional pipe arranged to obtain an air passage between it and the first named pipe and to constitute a wind shield to the perforations in such first named pipe, a base attached to the gas cock casing and a globe on such base; substantially as described.

4. The combination, in a gas lamp, of a casing provided with a chamber, a pipe provided with perforations adjacent to the ends thereof, means to attach the pipe to the casing to form a wind guard, a chimney provided with a flaring lower end, an additional and larger pipe open at the ends, such chimney and such additional pipe respectively attached to the perforated pipe concentric to the axis of such perforated pipe, with such chimney within the perforated pipe and such additional pipe arranged to obtain an air passage between it and the perforated pipe and to constitute a wind shield to the perforations therein, a globe and means to maintain the globe with the upper end thereof adjacent to the lower end of the perforated pipe; substantially as described.

Signed at Chicago, Cook county, Illinois, this 4th day of January, 1908.

CLEMENT W. BOYSE.

In the presence of—
DWIGHT B. CARMICHAEL,
CHARLES TURNER BROWN.